United States Patent Office 2,950,308
Patented Aug. 23, 1960

2,950,308
ADDUCTS OF BENZOQUINONEDIIMINES

Joseph E. Dunbar, Midland, Mich., assignor to The Dow Chemical Company, Midland, Mich., a corporation of Delaware No Drawing. Filed Oct. 28, 1959, Ser. No. 849,162

5 Claims. (Cl. 260—461)

This invention is directed to the cyclopentadiene adducts of benzoquinonediimine compounds and corresponds to the formula

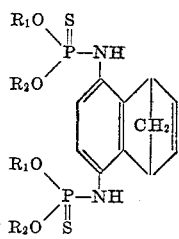

In this and succeeding formulas, each $R_1$ and $R_2$ represents a lower alkyl group containing from 1 to 4 carbon atoms, inclusive.

The compounds of this invention are white crystalline, solids, which are soluble in many organic solvents such as diethyl ether, benzene and ethanol. The compounds are of low solubility in water. The new compounds are useful as parasiticides and are particularly adapted to be employed as toxic constituents of compositions for the control of bacteria and fungi.

The condensation products of the present invention may readily be prepared in a Diels-Alder condensation reaction by mixing together cyclopentadiene with an N,N'-bis-(alkoxyphosphinothioyl)-p-benzoquinonediimine compound having the formula

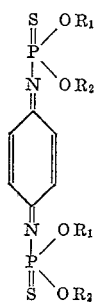

The cyclopentadiene and benzoquinonediimine compounds are preferably mixed together in an inert solvent as reaction medium. Suitable solvents include chloroform, benzene, toluene, and xylene. Under these conditions, the reaction temperatures may vary over a wide range, as the reaction takes place smoothly when the reactants are combined at any temperature in the range of from 0° C. to the boiling temperature of the reaction mixture or, in a pressure-sealed reaction vessel, to 150° C., with the production of the desired product. The reaction is conveniently carried out at room temperature. Good results are obtained when cyclopentadiene is employed in excess on a molar basis with respect to the benzoquinonediimine reactant.

In carrying out the reaction, the benzoquinonediimine reactant is dissolved in the reaction solvent, and to the resulting solution freshly prepared cyclopentadiene is added with stirring. Stirring is thereafter continued and the reaction mixture maintained at a reaction temperature for a period of from 5 seconds to 7 days to obtain the desired N,N' bis(alkoxyphosphinothioyl)-p-benzoquinonediimine-cyclopentadiene adduct. The latter is then recovered from the reaction mixture as residue by vaporizing off the solvent. The crude product may be recrystallized from solvents such as chloroform, carbon tetrachloride, ethyl acetate or cyclohexane.

The following examples illustrate the invention but are not to be construed as limiting.

*Example 1.*—*O,O,O',O'-tetramethyl (1,4-dihydro-1,4-methano-5,8-naphthylene)bis(phosphoramidothioate)*

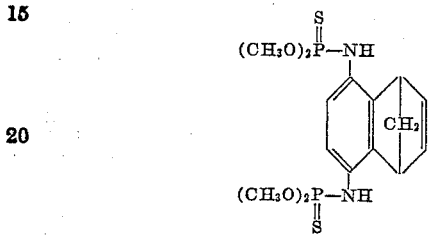

13.2 grams (0.200 mole) of freshly prepared cyclopentadiene was added to a solution of 10.7 grams (0.0303 mole) of N,N'-bis(dimethoxyphosphinothioyl)-p-benzoquinone-diimine in 100 milliliters of chloroform and the resulting mixture allowed to stand at room temperature for 42 hours. At the end of this period, the reaction mixture was brought to the boiling temperature and the hot solution decolorized with activated charcoal. The decolorized solution was then evaporated to dryness to obtain as residue an O,O,O',O'-tetramethyl (1,4-dihydro-1,4-methano-5,8-naphthylene)bis(phosphoramidothioate) product as a crystalline solid. The latter was purified by recrystallizing successively from ethanol, glacial acetic acid and ethanol to obtain a purified product melting at 165.5° C.

*Example 2.*—*O,O,O',O' - tetraethyl (1,4 - dihydro - 1,4-methano-5,8-naphthylene)bis(phosphoramidothioate)*

13 grams (0.20 mole) of freshly distilled cyclopentadiene is added to a solution of 12 grams (0.030 mole) of N,N'-bis(diethoxyphosphinothioyl)-p-benzoquinonediimine in 100 milliliters of chloroform and the resulting mixture allowed to stand at room temperature for several days. The reaction mixture is then heated to the boiling temperature, decolorized with activated charcoal and the decolorized solution is evaporated to dryness to obtain as residue an O,O,O',O'-tetraethyl (1,4-dihydro-1,4-methano - 5,8 - naphthylene)-bis(phosphoramidothioate) product having a molecular weight of 476.

*Example 3.*—*O,O,O',O'-tetraisopropyl (1,4-dihydro-1,4-methano-5,8-naphthylene)bis(phosphoramidothioate)*

In a manner similar to that previously described, 13 grams (0.20 mole) of cyclopentadiene and 14.0 grams (0.030 mole) of N,N'-bis(diisopropoxyphosphinothioyl)-p-benzoquinonediimine are reacted in chloroform solvent to obtain the desired O,O,O',O'-tetraisopropyl (1,4-dihydro-1,4-methano-5,8-naphthylene)-bis(phosphoramidothioate) having a molecular weight of 532.

*Example 4.* — *O,O,O',O'-tetra(normal-butyl) (1,4-dihydro - 1,4 - methano - 5,8 - naphthylene)bis(phosphoramidothioate)*

In a similar manner, 13 grams (0.20 mole) of cyclopentadiene and 16 grams (0.03 mole) of N,N'-bis(dinormal-butoxyphosphinothioyl)-p-benzoquinonediimine are reacted together in chloroform solvent to obtain the desired O,O,O',O'-tetra(normal-butyl) (1,4-dihydro-1,4- methano - 5,8 - naphthylene)-bis(phosphoramidothioate) product having a molecular weight of 588.

Example 5

In similar reactions the following compounds are prepared:

O,O'-dimethyl-O,O'-diethyl (1,4-dihydro-1,4-methano-, 5,8-naphthylene)bis(phosphoramidothioate) by the reaction of 1 mole of N,N'-bis(ethoxymethoxyphosphinothioyl)-p-benzoquinonediimine and cyclopentadiene.

O,O'-dimethyl-O,O'-diisopropyl (1,4-dihydro-1,4-methano-5,8-naphthylene)bis(phosphoramidothioate) by the reaction of N,N'-bis(methoxyisopropoxyphosphinothioyl)-p-benzoquinonediimine and cyclopentadiene.

O,O'-diethyl-O,O'-diisobutyl (1,4-dihydro-1,4-methano-5,8-naphthylene)bis(phopsoramidothioate) by the reaction of N,N'-bis(ethoxyisobutoxyphosphinothioyl)-p-benzoquinonediiamine and cyclopentadiene.

O,O,O',O',-tetra-normal-propyl (1,4-dihydro-1,4-methano-5,8-naphthylene)bis(phosphoramidothioate) by the reaction of N,N'-bis(di-normal-propoxyphosphinothioyl)-p-benzoquinonediimine with cyclopentadiene.

The compounds of the present invention have been found to be useful as toxic components in parasiticidal compositions. For such use the products may be dispersed on inert, finely divided solids and employed as dusts or may be dispersed in water with wetting agents and the resulting dispersions employed as sprays. In other operations, the products may be employed as constituents in emulsions or dispersions with or without the addition of wetting, dispersing or emulsifying agents. These compounds are particularly useful for the control of plant pathogens such as the causative organism of wheat rust disease (*Puccinia graminis-tritici*) and the causative organism of tomato early blight (*Alternaria solani*).

In a representative operation of its use as an agent for the control of plant pathogens, good controls of wheat rust disease were obtained when wheat plants susceptible to said disease were sprayed with an aqueous dispersion containing 0.5 pounds of O,O,O',O',-tetramethyl (1,4-dihydro-1,4-methano-5,8-naphthylene) bis (phosphoramidothioate) in 100 gallons of spray medium and thereafter inoculated with the rust fungus organism, *Puccinia graminis-tritici*..

The N,N'-bis(dialkoxyphosphinothioyl)-p-benzoquinone-diimines employed as starting materials in accordance with the teachings of the present invention may be prepared by (1) mixing together about 2 molar proportions of a suitable O,O'-dialkylphosphorochloridothioate with 1 molar proportion of phenylenediimine in the presence of about 2 molar proportions of an agent such as alkali metal hydroxide in an inert organic solvent at a temperature of from 0° to 90° C. to produce an intermediate O,O,O',O',-tetraalkyl-p-phenylene bis(phosphoramidothioate) and (2) reacting the intermediate thus prepared with slight excess on a molar basis of lead tetraacetate in an inert organic solvent such as benzene, chloroform, toluene or xylene in the temperature range of from —10° to 50° C. to produce the desired N,N'-bis (dialkoxy - phophinothioyl) - p-benzoquinonediimine and lead salt by-product, removing the latter by filtration and recovering the desired diimine reactant by conventional procedures.

I claim:

1. A cyclopentadiene adduct of N,N'bis(dialkoxyphosphinothioyl)-p-benzoquinonediimine having the formula

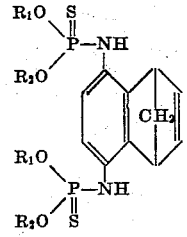

wherein $R_1$ and $R_2$ each represent a lower alkyl radical containing from 1 to 4 carbon atoms, inclusive.

2. O,O,O',O'-tetramethyl (1,4 - dihydro - 1,4-methano-5,8-naphthylene)bis(phosphoramidothioate).

3. O,O,O',O'-tetraethyl (1,4-dihydro-1,4-methano-5,8-naphthylene)bis(phosphoramidothioate).

4. O,O,O',O',-tetraisopropyl (1,4-dihydro-1,4-methano-5,8-naphthylene)bis(phosphoramidothioate).

5. O,O,O',O' - tetra(normal-butyl) (1,4 - dihydro-1,4,-methano-5,8-naphthylene)bis(phosphoramidothioate).

No references cited.